United States Patent
Kumagai

(10) Patent No.: US 7,238,038 B2
(45) Date of Patent: Jul. 3, 2007

(54) CARD HOLDING STRUCTURE FOR PORTABLE ELECTRONIC DEVICE

(75) Inventor: Keiichiro Kumagai, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 10/993,481

(22) Filed: Nov. 22, 2004

(65) Prior Publication Data

US 2005/0135052 A1    Jun. 23, 2005

(30) Foreign Application Priority Data

Nov. 28, 2003    (JP) ............................. 2003-399799

(51) Int. Cl.
*H01R 13/62* (2006.01)
(52) U.S. Cl. ...................... 439/326; 439/630
(58) Field of Classification Search ............ 439/326 I, 439/630, 326
See application file for complete search history.

(56) References Cited

U.S. PATENT DOCUMENTS

| | | | |
|---|---|---|---|
| 5,224,873 A * | 7/1993 | Duffet et al. ................ 439/326 |
| 5,661,634 A * | 8/1997 | Obata et al. ................. 361/684 |
| 6,383,027 B2 * | 5/2002 | Cabane et al. ............... 439/630 |
| 6,493,033 B1 * | 12/2002 | Glogan et al. ............... 348/375 |
| 6,602,096 B1 * | 8/2003 | Kronestedt et al. ........... 439/630 |
| 6,831,977 B2 * | 12/2004 | Kiernan et al. .......... 379/433.09 |
| 6,890,203 B2 * | 5/2005 | Matsunaga et al. ........... 439/331 |
| 6,966,785 B2 * | 11/2005 | Taguchi ...................... 439/108 |
| 2001/0005655 A1 * | 6/2001 | Cabane et al. ............... 439/630 |
| 2001/0053634 A1 * | 12/2001 | Camacho ..................... 439/630 |

FOREIGN PATENT DOCUMENTS

| | | |
|---|---|---|
| CN | 2588599 Y | 11/2003 |
| EP | 1 054 339 A1 | 11/2000 |
| EP | 1 085 453 A1 | 3/2001 |
| EP | 1 146 469 A1 | 10/2001 |
| JP | 2001-244004 | 9/2001 |
| JP | 2001-307027 | 11/2001 |
| JP | 2003-519893 | 6/2003 |
| WO | WO 98/13784 | 4/1998 |

* cited by examiner

*Primary Examiner*—Thanh-Tam Le
(74) *Attorney, Agent, or Firm*—Dickstein, Shapiro, LLP.

(57) ABSTRACT

In a portable electronic device, a card holding structure includes a plurality of holding members formed on a case to hold a card on a card connector having no holding member. The holding members include a flexible arm with an engaging portion and a stationary portion. The card can be attached/detached to/from the portable electronic device by bending the flexible arm.

15 Claims, 6 Drawing Sheets

CARD HOLDING STRUCTURE FOR PORTABLE ELECTRONIC DEVICE

This application claims priority to prior application JP 2003-399799, the disclosure of which is incorporated herein by reference.

BACKGROUND OF THE INVENTION

This invention relates to a card holding structure for a portable electric device such as a cellular telephone.

Recently, the portable electric device has come to provide with a card connector for a card such as an SIM (Subscriber Identification Module) card, a memory card, an IC (Integrated Circuit) card or the like. The card connector has contact terminals to be pressed on contact lands (or terminals) formed on a surface of the card by resilience thereof. Accordingly, positioning the card in a predetermined position is necessary for the electric connection between the card and the card connector.

An existing card connector has a card holding structure to position the card in the predetermined position. However, the card connector not only is expensive but also impedes miniaturization of the portable electric device.

SUMMARY OF THE INVENTION

It is therefore an object of this invention to provide a card holding structure capable of miniaturizing a portable electric device.

Another object of this invention is to provide a card holding structure capable of reducing a manufacturing cost of a portable electric device.

Other objects of this invention will become clear as the description proceeds.

According to an aspect of this invention, a card holding structure for use in a portable electronic device includes a case and a card connector. The card holding structure comprises a plurality of holding members formed on the case to hold the card down on the card connector.

According to another aspect of this invention, a portable electronic device includes a case, a card connector and a card holding structure. The card holding structure comprises a plurality of holding members formed on the case to hold the card down on the card connector.

According to still another aspect of this invention, a card holding method is for holding a card in a portable electronic device including a case and a card connector. The card holding method comprises the steps of inserting an edge of a card between stationary portions formed on the case, turning the card by using the edge of the card as an axis, and engaging an engaging portion provided on a flexible portion formed on the case with another edge of the card by bending and returning the flexible portion to press the card on the card connector down.

DESCRIPTION OF THE PREFERRED EMBODIMENT

Figure 1:
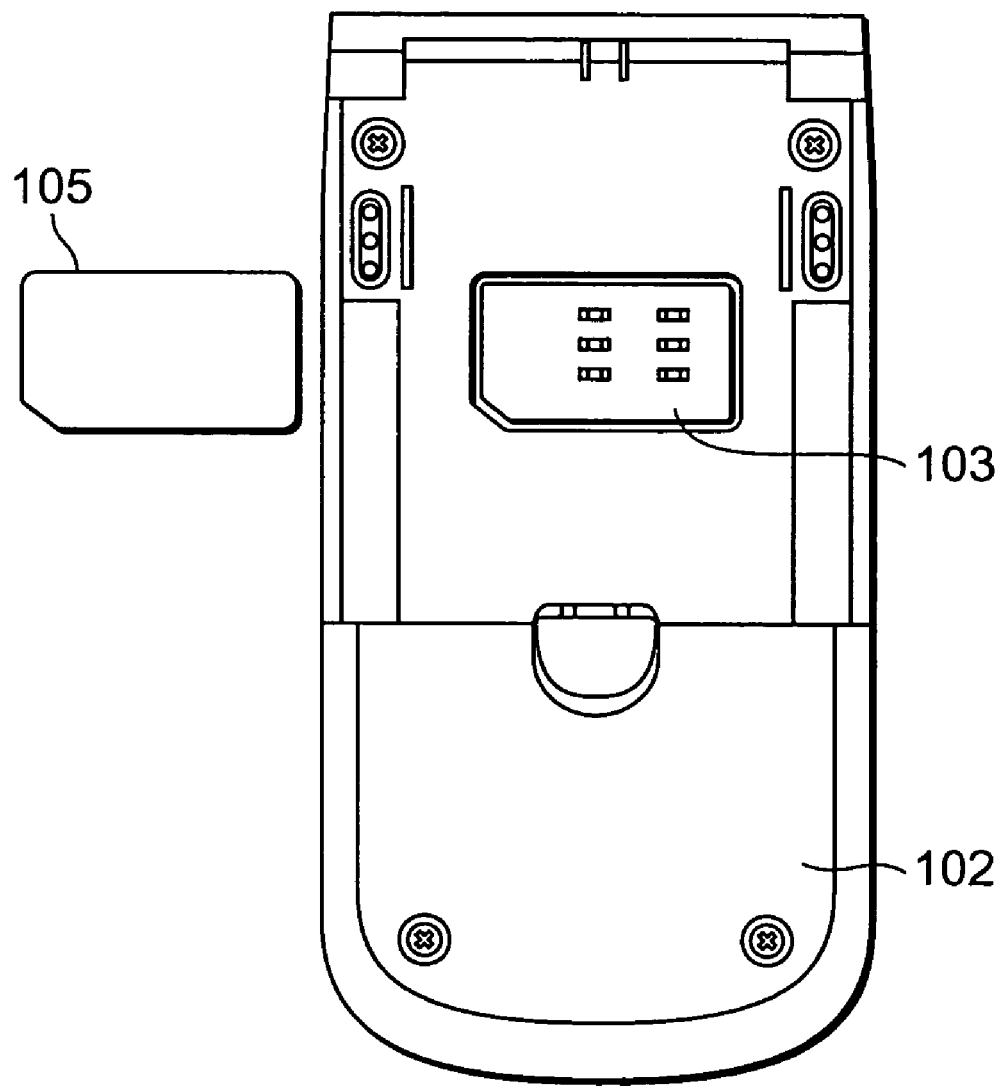
FIG. 1 is a rear view of an existing portable electronic device.
Figure 2:
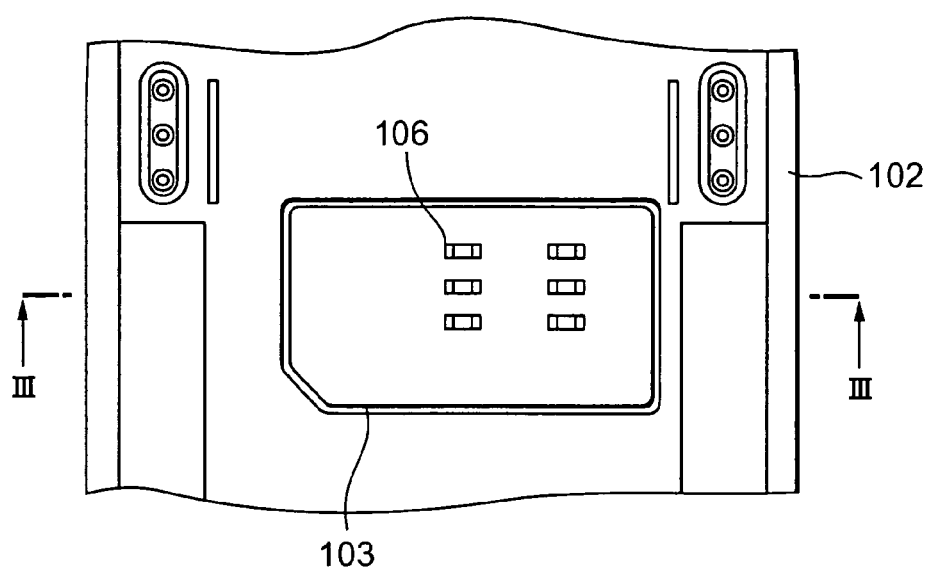
FIG. 2 is an enlarged view of a part of FIG. 1.
Figure 3:
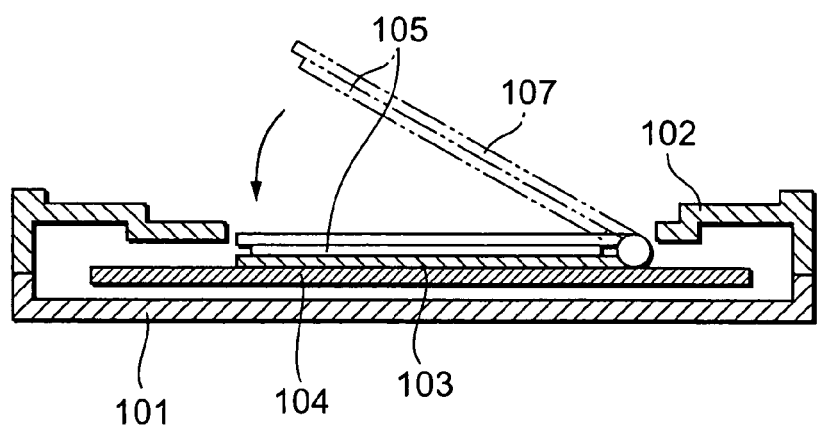
FIG. 3 is a sectional view taken along a line III—III in FIG. 2.

Referring to FIGS. 1 to 3, description will be at first directed to an existing portable electronic device having a card holding structure.

FIG. 1 is a rear view of the existing portable electronic device in which a rear cover (and a battery) is detached. The portable electronic device is a cellular telephone concretely. FIG. 2 is an enlarged view of a part of FIG. 1. FIG. 3 is a sectional view taken along a line III—III in FIG. 2.

As illustrated in FIGS. 1 to 3, the portable electronic device has a front case 101, a rear case 102 and a card connector 103 mounted on a circuit board 104 housed in a housing consist of the front case 101 and the rear case 102. A card, such as an SIM card, a memory card, an IC card or the like, has contact lands (not shown) formed on a surface thereof to come in contact with terminals 106 of the card connector 103. The card connector 103 provides a card holding mechanism including a card holding portion 107. The card holding portion 107 is omitted in FIGS. 1 and 2. The card holding portion 107 holds the card 105 and swings to hold the card 105 down on the card connector 103. Thus, the card 105 is electrically connected to the card connector 103.

The existing portable electronic device has a problem that the card connector 103 is expensive because of the card holding mechanism.

Figure 4:
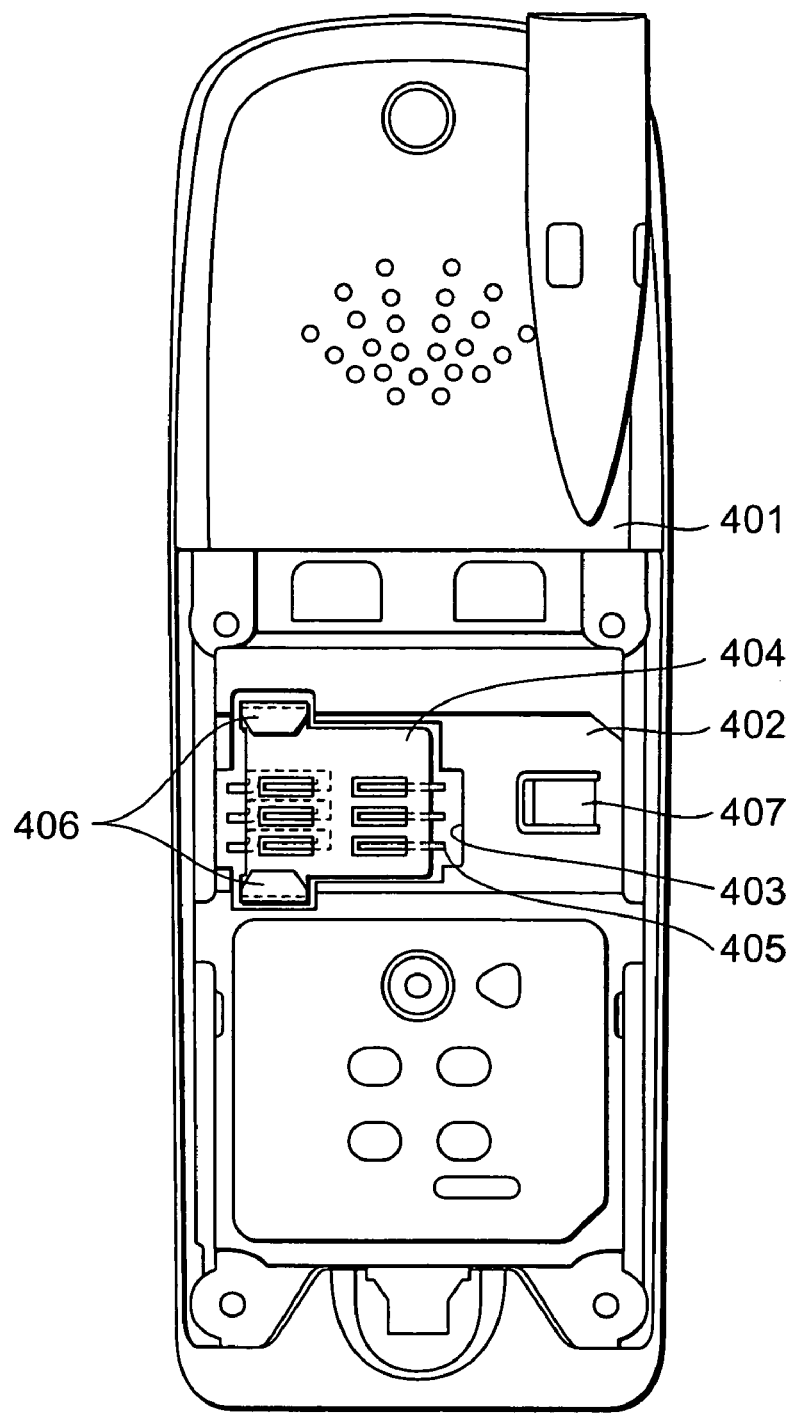
FIG. 4 is a rear view of another existing portable electronic device.

FIG. 4 is a rear view of another existing portable electronic device (or a cellular telephone) in which a rear cover (and a battery) is detached.

In FIG. 4, the portable electronic device has a rear case 401. The rear case 401 defines a recess 402 and an opening 403. The recess 402 is for receiving a card (not shown) while the opening 403 is for exposing a card connector 404 in the recess 402. The cord connector 404 is mounted on a printed circuit board 405 covered by the rear case 401 and has a pair of holding portions 406. The rear case 401 further provides a case side stopper 407 having a rectangular shape and protruding into the recess 402 to form a cantilever leaf spring.

The card is attached to the portable electronic device as follows.

At first, the card is placed at a right-hand side in the recess 402. Then, the card is slid to a left-hand side in the recess 402 to insert the left-hand edge portion thereof between the holding portions 406. If necessary, the card is pressed toward the rear case 401 against resilience of the case side stopper 407 and/or of contact terminals of the card connector 404 while the card is slid to the left-hand side in the recess 402. In consequence, the left-hand edge portion of the card is inserted between the holding portions 406 and held by them. In this state, the case side stopper 407 engages with a right-hand edge of the card to prevent the card from moving toward the right hand side. When the rear cover is attached to the rear case 401 together with the battery, the rear cover and/or the battery presses a right-hand edge portion of the card against resilience of the contact terminals of the card connector 404.

The portable electronic device has a problem that it is hard to miniaturize. This is because the space for sliding the card is necessary in the recess 402 of the rear case 401. In addition, the card connector 404 is expensive because of the holding portions 406.

Such a portable electronic device is disclosed in Unexamined Japanese Patent Publication No. 2001-244004.

Referring to FIGS. 5 to 9, the description will proceed to a portable electronic device providing a card holding structure according to a preferred embodiment of this invention.

Figure 5:
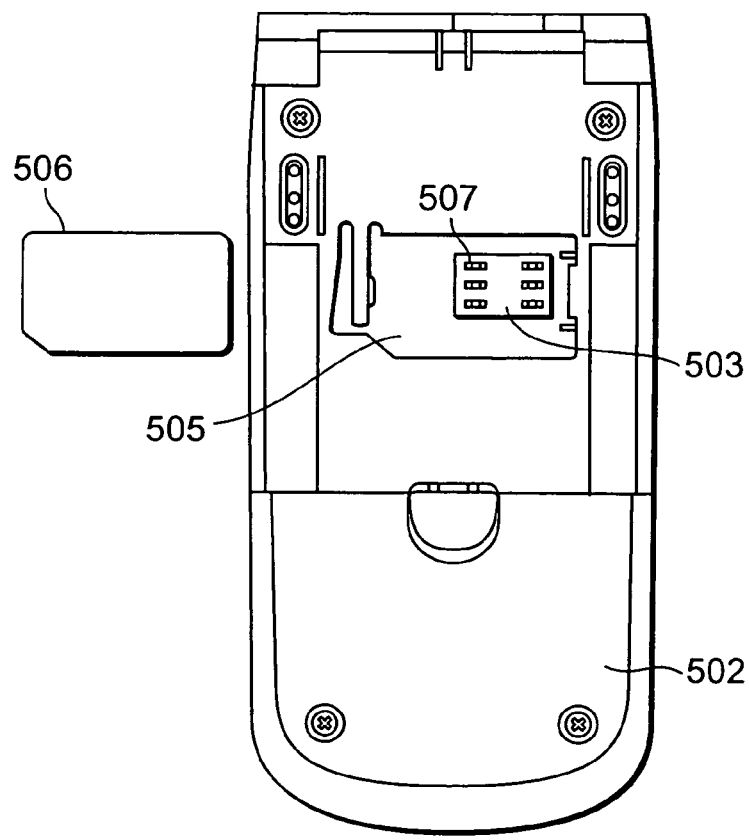
FIG. 5 is a rear view of a portable electronic device according to a preferred embodiment of this invention.
Figure 6:
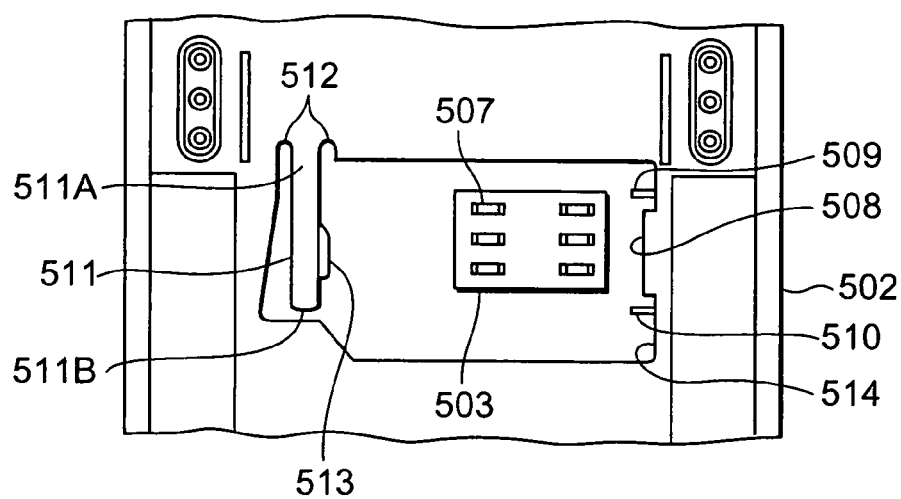
FIG. 6 is an enlarged view of a part of FIG. 5.
Figure 7:
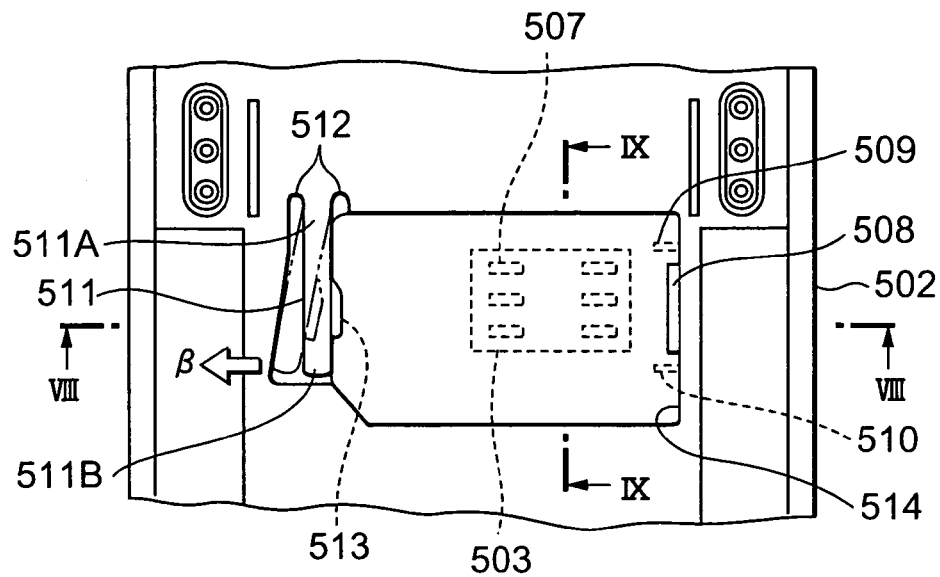
FIG. 7 is an enlarged view for describing a card holding structure of the portable electronic device of FIG. 5.
Figure 8:
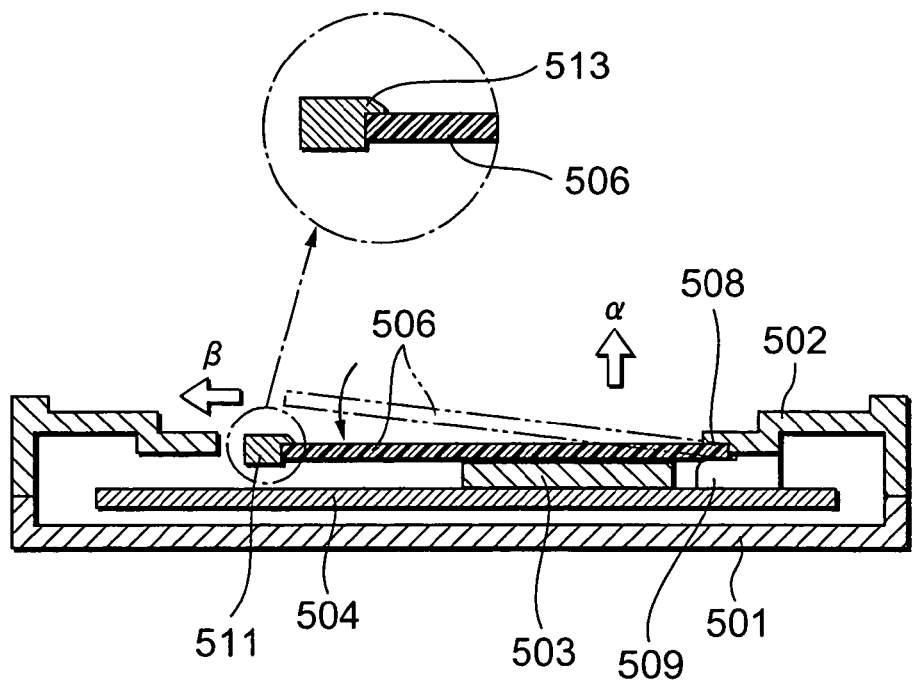
FIG. 8 is a sectional view taken along a line VIII—VIII in FIG. 7.
Figure 9:
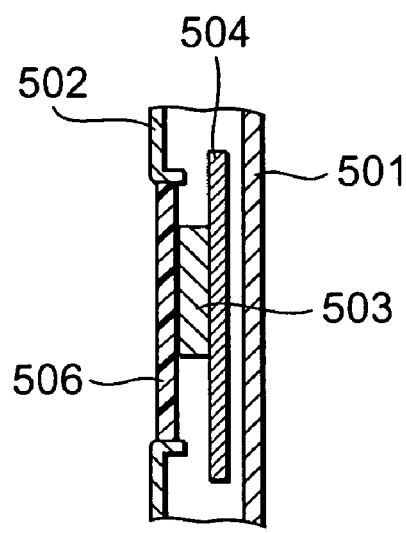
FIG. 9 is a sectional view taken along a line IX—IX in FIG. 7.

FIG. 5 is a rear view of the portable electronic device in which a rear cover is detached. FIG. 6 shows the card holding structure. FIG. 7 shows a state that a card is attached to the card holding structure. FIG. 8 is a sectional view for describing attachment of the card to the card holding structure. FIG. 9 is another sectional view showing the state that the card is attached to the card holding structure.

As illustrated in FIGS. 5 and 8, the portable electronic device has a front case 501, a rear case 502, a card connector 503 mounted on a circuit board 504 housed in a housing consist of the front case 501 and the rear case 502. The rear case 502 defines a receiving space 505 for receiving a card 506 such as an SIM card, a memory card, an IC card or the like. The card 506 can be attached/detached to/from the portable electronic device. The card connector 503 has contact terminals 507 to be electrically connected to contact lands formed on a lower surface of the card 506.

As shown in FIGS. 6 and 7, the rear case 502 provides a card holding structure including stationary portions 508–510 and a flexible arm 511 which project into the receiving space 505. The stationary portions 508–510 and the flexible arm 511 may be formed in a body together with the rear case 502. Fore instance, the stationary portions 508–510, the flexible arm 511 and the rear case 502 are made by molding using resin which is elastic material.

As illustrated in FIG. 8, each of the stationary portions 509 and 510 has a top surface lower than a bottom surface of the stationary portion 508 so that an edge of the card 506 is held between the stationary portion 508 and the pair of the stationary portions 509 and 510. The stationary portion 508 is referred to as a main stationary portion because it is used to hold the card as mentioned later. On the other hand, the stationary portion 509 and 510 are referred to as subsidiary stationary portions because it is used to position the card.

Returning to FIGS. 6 and 7, the flexible arm 511 can be bent resiliently because of its shape and elasticity. In detail, the flexible arm 511 includes an arm body having a fixed end 511A and a free end 511B to serve as a cantilever spring. The free end 511B can move in a direction β while the fixed end 511A serves as an axis. The rear case 502 has round shape portions 512 at the base of the flexible arm 511. The round shape portions 512 disperse stress generated by bending the flexible arm 511. Furthermore, the flexible arm 511 provides an engaging portion 513 protruding toward the stationary portion 508. The engaging portion 513 engages an upper surface of the card 506 received in the receiving space 505 and holds it down.

The card connector 503 has no card holding member and a simple structure. Accordingly, the card connector 503 can be made in the minimum size. Such a card connector is inexpensive. Thus, the portable electronic device can be miniaturized and its manufacturing cost can be reduced.

An attaching operation of the card to the portable electronic device is made as follows.

As illustrated in FIG. 8, firstly, the edge of the card 506 is inserted between the stationary portion 508 and the pair of the stationary portions 509 and 510. In this time, the stationary portions 508–510 and an inner wall portion 514 of the rear case 502 prevent the card 506 from coming into between the rear case 502 and the circuit board 504. Thus, the stationary portions 508–510 cooperate with one another to position the card in the receiving space 505.

Secondly, the card 506 is turned by using the edge of the card 506 as an axis. In other words, the card 506 is leaned toward the card connector 503. Then, the card 506 comes into contact with the contact terminals 507. The contact terminals 507 have resilience in a direction α when it is pressed with the card 506. If the card 506 is turned still more against the resilience of the contact terminals 507, the opposite edge of the card 506 comes into contact with the engaging portion 513. In this condition, the card 506 can be turned to be parallel to the circuit board 504 if the flexible arm 511 is moved in the direction β to separate from the card 506. After that, the engaging portion 513 engages at the upper surface of the card 506 by returning the flexible arm 506 to the original position. Thus, the stationary portion 508 and the flexible arm 511 serves as holding members to hold the card 506 down on the card connector 503. That is, the card 506 is held by the card holding structure and electrically connected to the card connector 503. FIGS. 8 and 9 show the state that the card 506 is held by the card holding structure.

The card 506 held by the card holding structure always receives the resilience of the contact terminals 507 in its thickness direction. The stationary portion 508 and the engaging portion 513 of the flexible arm 511 prevent the card 506 from moving along a thickness direction of the card 506 against the resilience of the contact terminals 507. Furthermore, the stationary portion 508 and the engaging portion 513 prevent the card 506 from moving in a direction perpendicular to both of the directions α and β together with the contact terminals 507. Regarding a direction parallel to the direction β, the stationary portions 508–510, the flexible arm 511 and the inner wall portion 514 prevent the card 506 from moving together with the contact terminals 507. Thus, the card 506 is prevented from moving in all directions.

The card 506 is detached as follows.

When the flexible arm 511 is moved in the direction β and the card 506 is released from the engaging portion 513, the card 506 is pushed up by the resilience of the contact terminals 507. Because the stationary portion 508 holds the edge of the card 506, the card 506 is turned by using the edge thereof as the axis. Thus, the card 506 can be detached from the card holding structure.

While this invention has thus far been described in conjunction with the preferred embodiment thereof, it will readily be possible for those skilled in the art to put this invention into practice in various other manners.

For example, the personal electric device may be a personal digital assistant.

Figure 10:
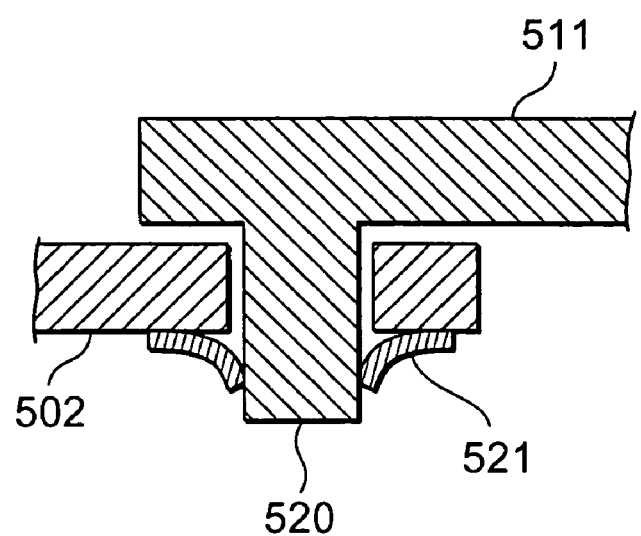
FIG. 10 is a sectional view for describing another flexible arm.

Moreover, the flexible arm 511 may be coupled to the rear case 502 with a rotation axis. As shown in FIG. 10, the rotation axis 520 is formed in a body with the flexible arm 511. Alternatively, the rotation axis may be formed in a body with the rear case 502. Moreover, the rotation axis may be formed independently of both of the rear case 502 and the flexible arm 511. In addition, the rotation axis 520 may provide a flange, which can be pressed into a receiving hole formed in the rear plate or the flexible arm 511, instead of a grip ring 521 shown in FIG. 10.

Alternatively, the flexible arm 511 may be supported at both ends to be bent at the middle part thereof. In this case, it is desirable that the engaging portion 513 is formed at the middle part.

Furthermore, the engaging portion 513 may be formed independently of the flexible arm 511 and fixed to the flexible arm 511. In addition, the engaging portion 513 is not always oriented toward the stationary portion 508. That is, the engaging portion 513 may be formed on an upper side or a lower side of the receiving space 505 in FIG. 5. At any rate, the engaging portion 513 must be formed on a side different from that of the stationary portions 508–510.

Still furthermore, the stationary portion 508 may comprise plural parts formed on an edge of the rear case in a line.

What is claimed is:

1. A card holding structure for use in a portable electronic device including a case and a card connector, comprising: a plurality of holding members formed on the case to hold a card down on the card connector, wherein the card connector has contact terminals to be electrically connected to contact portions of the card; and wherein said holding members include a flexible arm, said flexible arm being attached to said card holding structure at only one end, and being bent when the card is attached/detached to/from the portable electronic device, a main stationary portion, and a non-flexible subsidiary stationary portion projecting within the case and in parallel with the main stationary portion, to cooperate with said main stationary portion, said subsidiary stationary portion and said main stationary portion simultaneously contacting opposite surfaces of the card when supporting the card.

2. A card holding structure claimed in claim 1, wherein said holding members hold the card by means of resilience of the card connector.

3. A card holding structure claimed in claim 2, wherein the resilience acts in a thickness direction of the card.

4. A card holding structure claimed in claim 1, wherein said flexible arm is made of elastic material.

5. A card holding structure claimed in claim 1, wherein said flexible arm is coupled to the case with a rotation axis.

6. A card holding structure claimed in claim 1, wherein said flexible arm comprises an arm body and an engaging portion protruding from said arm body to hold the card down.

7. A card holding structure claimed in claim 1, wherein said the card comprises a subscriber identification module card.

8. A portable electronic device including a case, a card connector and a card holding structure, wherein the card holding structure comprises: a plurality of holding members formed on the case to hold a card down on the card connector, wherein the card connector has contact terminals to be electrically connected to contact portions of the card; and wherein said holding members include a flexible arm, said flexible arm being attached to said card holding structure at only one end, and being bent when the card is attached/detached to/from the portable electronic device, a main stationary portion, and a non-flexible subsidiary stationary portion projecting within the case to and in parallel with the main stationary portion, cooperate with said main stationary portion, said subsidiary stationary portion and said main stationary portion simultaneously contacting opposite surfaces of the card when supporting the card.

9. A portable electronic device claimed in claim 8, wherein said holding members hold the card by means of resilience of the card connector.

10. A portable electronic device claimed in claim 9, wherein the resilience acts in a thickness direction of the card.

11. A portable electronic device claimed in claim 8, wherein said flexible arm is made of elastic material.

12. A portable electronic device claimed in claim 8, wherein said flexible arm is coupled to the case with a rotation axis.

13. A portable electronic device claimed in claim 8, wherein said flexible arm has an arm body and an engaging portion protruding from said arm body to hold the card down.

14. A portable electronic device claimed in claim 8, wherein said the card comprises a subscriber identification module card.

15. A card holding method for holding a card in a portable electronic device including a case and a card connector, the card connector having contact terminals to be electrically connected to contact portions of the card, the method comprising the steps of: inserting an edge of a card between a main stationary portion and a subsidiary stationary portion each formed on the case; turning the card by using the edge of the card as an axis; and engaging an engaging portion provided on a flexible portion formed on the case with another edge of the card by bending and returning the flexible portion to press the card on the card connector down, the subsidiary stationary portion comprising one or more non-flexible projections within the case and in parallel with the main stationary portion, that cooperate with the main stationary portion, the subsidiary stationary portion and the main stationary portion simultaneously contacting opposite surfaces of the card when supporting the card.

* * * * *